FIG. 1

INVENTOR.
JACK F. SHANNON
BY
Raymond D. Junkins
ATTORNEY

FIG. 2

NARROW — PROPORTIONAL BAND SETTING — WIDE
GREATEST — SENSITIVITY — LEAST

INVENTOR.
JACK F. SHANNON
BY Raymond D. Junkins
ATTORNEY

INVENTOR.
JACK F. SHANNON
BY
Raymond D. Junkins
ATTORNEY

United States Patent Office 2,743,710
Patented May 1, 1956

2,743,710

CONTROL SYSTEMS

Jack F. Shannon, Euclid, Ohio, assignor to Bailey Meter Company, a corporation of Delaware Application November 6, 1952, Serial No. 318,992

12 Claims. (Cl. 122—451.2)

My invention relates to systems and apparatus for indicating, recording, or otherwise exhibiting and/or controlling the value of a position, measurement or variable. More particularly, the invention relates to such systems wherein a fluid pressure is established representative of that which is to be measured or controlled, and then the fluid pressure is used to actuate an exhibiting or controlling device. While not necessarily so limited, the invention is particularly adapted and useful in fluid pressure telemetering systems employing air under pressure as the active motive fluid and is so disclosed herein by way of example only.

In many instances the physical location of the measuring point may be far removed from the location of a control valve; and both, a considerable distance from availability to the operator who should be able to observe the value of the variable, the effect of the regulation, as well as to have available the possibility of removing the system from "automatic" and placing it under "manual" control.

Fluid pressure telemetering is known wherein a fluid pressure is developed continuously bearing a relation to the value of the variable or to the extent and direction of departure of the value from desired standard or set-point. Such a measuring-controller is a transmitter which may be indicating and recording and may preferably be located adjacent the desirable point of measurement of the variable, for many reasons. The fluid loading pressure is transmitted to a control valve for positioning the same, and the transmitter and valve may be widely separated. Intermediate the two is a manual-automatic selector station which may be conveniently located upon a control panel, with other measuring and controlling instrumentalities at a central location, under observation of an operator. It is frequently necessary, in such a system, to have one or more fluid pressure relays and these are preferably functionally located intermediate the transmitter and the selector station so that the relay effects may be available upon the regulating valve through the selector station but, under "manual" control, the relay is not effective upon the regulating valve as would be the case were it functionally located between the selector station and the regulating valve.

The fluid pressure relay, or relays, receiving the fluid loading pressure which is representative of the variable, establish an output control pressure which may be of the same, or of a different magnitude, for actuation of the receiver mechanism. Frequently such relays are employed to give the algebraic summation of two or more individual loading pressures, to double or halve the loading pressure value, to ratio it, or to otherwise modify the loading pressure representative of one or more variables into a resultant outgoing control pressure bearing a determined value relationship to the measurement variable or variables. The relays are usually physically located intermediate the point of measurement and the point of exhibiting or controlling. Usually they are of the force-balance, position-balance, or force-position-balance type and employ expansible-contractible pressure receiving chambers having a movable wall for varying a force or position system. Common types include bellows or diaphragms of various materials.

In such a system it has, in the past, been usual to provide the measuring-controller (transmitter) with proportional band or sensitivity adjustability, as well as with set-point or standard setting adjustability. But, if the transmitter is located far from the operator he is unable to observe, or change, these adjustments.

One object of my present invention is therefore to provide a fluid pressure system of the type described with proportional band and set point adjustment possibilities remote from the transmitter and even remote from each other if desired; preferably the two adjustments may be convenient to the operator.

Furthermore, the operator should have before him a continuous indication or record of the actual value of the variable as well as of the remotely chosen set point value to observe the effectiveness of the regulation at all times.

Another object of the invention is to provide an improved fluid pressure relay, preferably of the ratio type, receptive of remote set point adjustability, and having proportional band or sensitivity adjustability.

Still another object is to provide such an improved relay of a force-position-balance type having a plurality of force-balance systems interrelated by position-balance. Such a basic relay type is disclosed and claimed in the co-pending application of Harvard H. Gorrie, S. N. 311,098, filed September 23, 1952, owned by the present assignee, and is provided with proportional band or sensitivity adjustments which are arranged for manual manipulation. The present invention provides improvements thereover, including means for remotely manually varying the sensitivity or proportional band setting of the relay, varying the sensitivity in accordance with a variable, or automatically changing the sensitivity of the relay responsive to one or more variables which are preferably applied by fluid pressure means.

A principal object of the invention is in the provision of a force-position-force-balance relay having a sensitivity or proportional band adjustment remotely positionable or automatically adjustable in accordance with one or more variables.

Other objects will appear in the course of the following description.

In the drawings:

Fig. 5 diagrammatically illustrates the embodiment of my improved relay in a fluid flow ratio control system.

Fig. 6 shows a modification of a portion of my improved relay incorporating characterizing means.

Fig. 8 illustrates a fluid pressure relay having remotely actuable sensitivity changing possibilities, by manual means or by a fluid pressure established representative of a variable, position, condition, or the like.

Fig. 9 is a graph in connection with Fig. 8.

Figure 1:
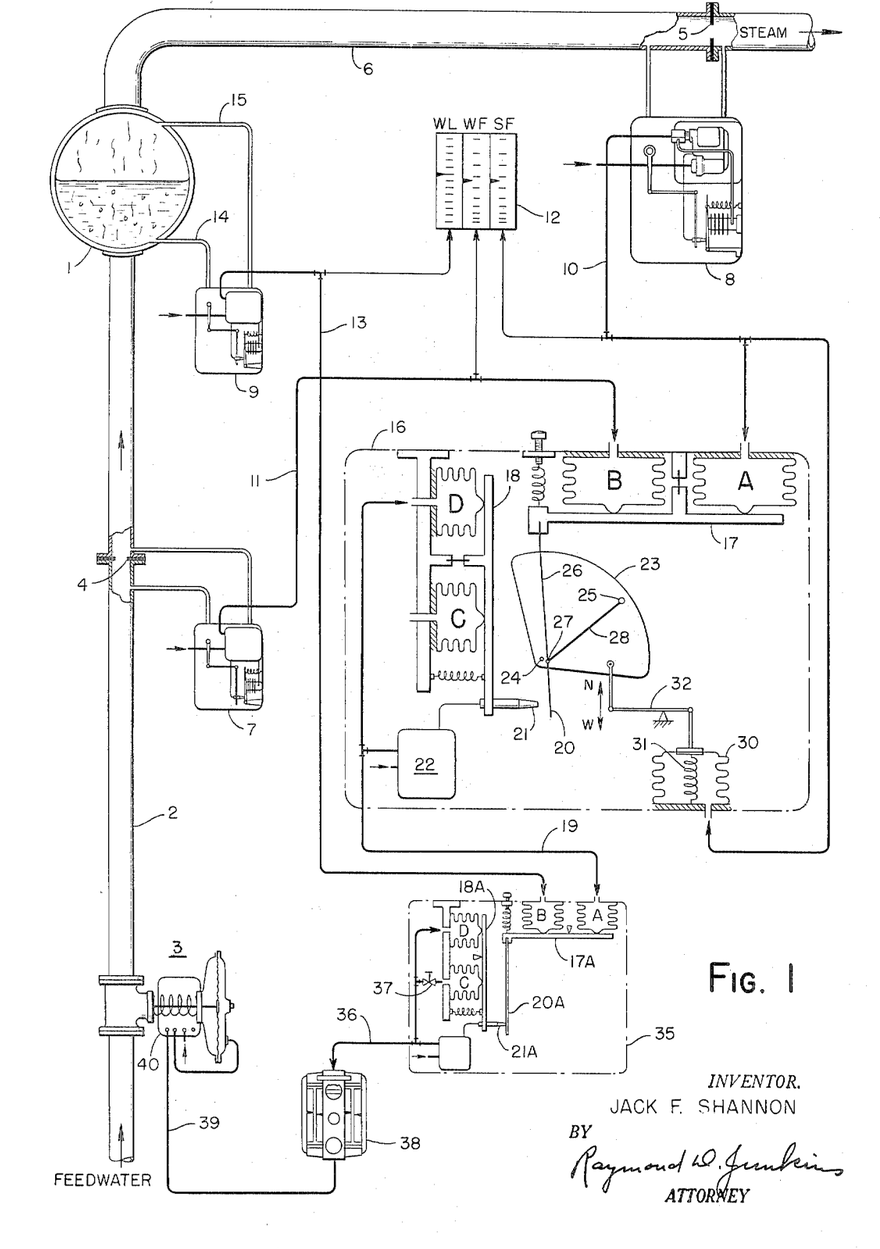
Fig. 1 diagrammatically illustrates a three-element feed water control system including a relay embodying the present invention.

Referring now to Fig. 1, I show therein, quite diagrammatically, a fluid pressure control system of the commonly termed three-element type for regulating the rate of supply of feed water to a vapor generator. Water is supplied to the separation drum 1 of the vapor generator through a pipe 2 under the control of a regulating valve 3, responsive to three variable conditions in the operation of the unit, namely, rate of steam outflow, rate of water inflow, and liquid level within the drum 1. Such three-element feed water control systems are in general old in the art. It is well understood and accepted that feed water inflow rate should be proportioned to steam outflow rate but that, to take account of discrepancy in control and measurement, as well as in valve charactertistics, leakage, blowdown, etc., it is quite desirable to continually check back upon the control from a measurement of the actual level of liquid within the separation drum. Thus, I primarily balance water inflow rate against steam outflow rate and use the discrepancy, if any, in primary control of rate of liquid inflow. The continuous measure of liquid level within the separation drum is used as a readjusting control upon the rate of liquid inflow.

Fluid pressure control systems are known for correlating the three named measurements and utilizing the resultant control effect in remotely positioning the regulating valve 3 in the feed water inflow conduit 2. The present invention is concerned particularly with an improved relay in such a fluid pressure control system.

Located in the pipe 2 is an orifice 4 producing a pressure differential bearing a known relation to the rate of water flow therethrough. Similiarly, an orifice 5 is located in the conduit 6 continuously producing a pressure differential bearing a known relation to rate of flow of steam therethrough. A meter 7 is connected across the orifice 4, and a meter 8 is connected across the orifice 5. These meters may be of the head type or the flow type.

Fluid rate of flow meters of the orifice type are responsive to the differential in pressure existing across the orifice as a result of fluid flow through the restriction. Rate of flow varies as the square root of the differential pressure (head). A "head" meter indicates in equal increments in terms of differential pressure, but over a non-uniformly graduated scale in terms of flow. A "flow" rate meter may indicate directly in terms of quantity or weight rate of flow over equal graduations. It will thus be seen that, with a head meter, equal increments of flow will produce very small increments of position, power, or motion, at low rates and relatively large increments at the higher rates. For example, the first 10% in quantity flow rate (from 0 to 10% maximum flow) will produce a differential pressure of 1% of the maximum pressure differential; while the last 10% (from 90 to 100% maximum flow) will have an equivalent differential pressure change of 19%.

The chart of a float actuated meter will be uniformly graduated to read in terms of "$h$" but non-uniformly graduated to read in terms of $Q$ or $W$. For a Ledoux bell meter, a uniformly graduated chart may be used to read $Q$ or $W$. This is because $Q \propto \sqrt{h}$ and $W \propto \sqrt{h}$.

But it is often highly desirable to utilize head type meters in a system of the type here under consideration. In the first place, the meter 9, connected across the drum 1 to be sensitive to liquid level therein, is necessarily a head type meter, there being no flow rate involved. Thus, it is basically preferable to have all three meters 7, 8 and 9 of the same (head) type for similarity of action and response.

Furthermore, the flow rate type of meter in automatically extracting $\sqrt{h}$ is usually more expensive than a head meter. This is particularly true in connection with the flow measurement or response of modern high temperature and high pressure flowing fluids. For example, the steam flowing in conduit 6 may be at a pressure of over 2000 p. s. i. g. and a temperature of around 1000 F.T.T. The use of a head measuring instrumentality may, in such instance, indicate a compact and simple force-balance type of device which would not be adapted of itself to extracting the functional relation between head and flow rate.

I contemplate, in the system of Fig. 1, that the devices 7, 8 and 9 be of the simplest design, each responsive to differential pressure (head) and each producing a manifestation directly representative thereof. The invention will interrelate the several manifestations and control therefrom, overcoming the obstacles of different power or motion availabilities mentioned.

Specifically, in Fig. 1, the head meter 8 is continually responsive to the differential pressure produced across the orifice 5 by the flow of steam through the conduit 6. It is provided with a nozzle-baffle couple and a booster relay, of the type disclosed and claimed in the Gorrie et al. application S. N. 289,402, filed May 22, 1952, owned by the present assignee, and is arranged to continuously establish in a pipe 10 a pneumatic fluid loading pressure within the range 5–25 p. s. i. g. proportionately representative of the expected range in differential pressure across the orifice 5. Similarly, the device 7 is arranged to continuously establish in a pipe 11 a pneumatic fluid loading pressure within the range 5–25 p. s. i. g. proportionately representative of the design range of differential pressure across the orifice 4.

Preferably the designed capacities of the steam and water orifices would be such that the maximum capacities would line up with each other and at any rate of operation the proper water inflow for existing steam outflow would establish pneumatic pressures of the same or comparable value within the pipes 10 and 11. Thus, the indicators WF and SF, of the indicating device 12, would read together if the proper supply rate of water were had for the existing steam outflow rate.

The level responsive device 9 is arranged to produce a pneumatic fluid loading pressure within a pipe 13 continuously representative of liquid level within the separation drum 1, between the points of connection of pipes 14 and 15, to the end that some preselected loading pressure within the pipe 13 will be representative of the desired liquid level to be maintained within the drum 1 and this will be shown on the WL scale of indicator 12. The indicator 12 would preferably be located adjacent the control station for the operator of the vapor generator unit. The WL scale will be graduated in equal increments of level within the drum 1. The WF and SF scales however, being on a head basis, would be unequally graduated in terms of flow rate, but the WF and SF pointers will read together if the actual rate of water supply is proper for the existing rate of steam outflow.

In a three-element feedwater supply system of the type here under discussion it is common practice to normally regulate the valve 3, and thus the water inflow rate, in proportion with the demand or steam outflow rate of the unit. Inasmuch as discrepancies in this balance are bound to occur, it is highly desirable to continuously check back from an actual measure of the liquid level within the drum 1. Such discrepancies between the two flow rates may be caused by change in density conditions of the water or steam, control valve characteristics, differential pressure variations between the water inflow and the steam outflow, leakage of water from the system, blowdown of highly concentrated water from the unit, and for other reasons well known. It is thus common, that a primary control of water inflow rate in accordance with steam outflow rate be had, with a readjustment of the inflow rate, if necessary, responsive to departure of actual liquid level within the drum 1 from desired level. It is in the interrelation of the three measurements of steam flow rate, water flow rate, and actual liquid level, that the present invention is particularly concerned in the final control of the regulating valve 3.

A problem arises in view of the unequal increments, over the range of operation, of head responsive devices in relation to actual increments of rate of flow, as previously mentioned. If the flow rate of steam and/or water is very low then equal increments in change of flow rate will result in very small variations in differential pressure across the respective orifice and correspondingly very minor variations in the fluid loading pressure (within the range 5–25 p. s. i. g.) in the pipe 10 and/or in the pipe 11. For example, if the steam flow rate is 20% of maximum and the water flow rate is 10% of maximum, the difference (SF—WF) equals 10% of maximum capacity. A correction, based on "flow rate" would be in the order of 10% of max. Similarly, should SF=90% and WF= 80%, the difference is 10% of capacity and the "flow rate" correction is still 10%. However, on a differential pressure (head) basis, for the same discrepancy, the equivalent head values are Percent flow: Percent head
10______________________________________ 1
20______________________________________ 4
80______________________________________ 64
90______________________________________ 81 an indicated correction of 3% head at the lower example and 17% head at the upper example. Thus, the 10% flow increment of unbalance between the water inflow rate and the steam outflow rate would result in a pneumatic loading pressure unbalance between pipes 10 and 11 of 3% of (25—5)=.6 p. s. i. at the lower rating and 17% of (25—5)=3.4 p. s. i. at the higher rating, a ratio of about 6 to 1. The arrangement of the present invention is particularly adapted to providing a varying sensitivity with rating, to the system, so that the system as a whole is equally as sensitive at low boiler ratings as it is at high boiler ratings. This has not previously been possible with known systems and apparatus.

At 16 I indicate a force-position-force-balance relay of the type disclosed and claimed in the previously mentioned application of Harvard H. Gorrie, S. N. 311,098, filed September 23, 1952, having four expansible-contractible chambers, designated A, B, C and D, taking the form of metallic bellows although they might equally as well be diaphragms or other well known constructions which change the position of a movable wall thereof when subjected to varying pressures; in the present instance internally. Chamber A receives the loading pressure of the pipe 10, whereas chamber B receives the loading pressure of the pipe 11. Equal area chambers A and B each have one wall fixed to the casing of the relay 16 and the movable wall of each acts on a force-balance beam 17 which is pivoted intermediate the chambers. In similar manner the movable wall of the D and C chambers acts upon a force beam 18, pivoted intermediate the chambers. In the present arrangement the C chamber is an idle chamber, open to the atmosphere, while the D chamber receives the output control pressure of the relay 22 which is also available in an output pipe 19.

As described in the Gorrie application S. N. 311,098, the relay 16 is provided with proportional band or sensitivity adjustability in relation to a nozzle-baffle couple, one element of which is positioned by and with the force-beam 17 and the other element by and with the force-beam 18. The force-balance beams 17 and 18 are not physically connected, for the balancing of forces therebetween, but are functionally interrelated by way of the motion or position of cooperating parts carried by one by one beam and the other by the other. Hence the designation that this relay is of the force-position (or motion)-balance type.

The principle of operation is based upon any discrepancy between the loading pressures effective in the A and B chambers causing a resulting motion of the force-beam 17 and the baffle 20, relative to the nozzle 21, to cause a variation in output pressure of the booster relay 22 in the pipe 19 and balancing chamber D. The application of the output control pressure in the D bellows positions the nozzle 21 to re-establish the normal relation of the nozzle-baffle couple. If predetermined desired relation exists between the rate of steam outflow and the rate of water inflow then the loading pressures in pipes 10, 11 and in chambers A, B will be equal or in balance and a predetermined interrelation between the nozzle 21 and baffle 20 will exist, thereby producing a predetermined output pressure from the device 22 in the D chamber and in the output pipe 19. Any discrepancy between steam outflow rate and water inflow rate, as indicated by unbalance of the A—B chambers and balance beam 17, will result in a change in the output control pressure in the pipe 19. But as pointed out above, an increment of flow rate discrepancy will, on a head basis, produce an effect upon beam 17 of only about one sixth the value at low ratings as the same increment would produce at higher ratings. Desirably, the given increment should have the same effect at all ratings.

In connection with the nozzle-baffle couple there is provided a proportional band or sensitivity adjustment. The "proportional band" is a ratio of the change in beam 17 unbalance to the change in beam 18 unbalance and thereby in the output pressure of chamber D and pipe 19. The relay 16 is basically a "ratio relay" and thus a change in the ratio between the effect of force-beam 17 and that of force-beam 18 is a change in proportional band. This is the sensitivity of the system. The "proportional band" may be expressed as:

Percent proportional band =

$$\frac{\text{change in input loading pressure} \times 100}{\text{change in output control pressure}}$$

The proportional band availability for the relay of the Gorrie application varies from about 4% to 300% through the adjustable range of the mechanism. As explained therein a sector 23 is angularly movable around a fixed pivot 24 and carries near its periphery a pivot 25. The baffle 20 forms an extension of a baffle arm 26 which is suspended from one end of the force-beam 17. Near the end of arm 26 is a floating pivot 27, and a floating link 28 joins the pivots 25 and 27. Angular movement of the adjusting segment 23 varies the relative positioning of elements 27 and 20 and thus the sensitivity between movement of beam 17 and movement of beam 18. My present invention is concerned with a remote or automatic positioning of the segment 23 as will be explained.

Figure 2:
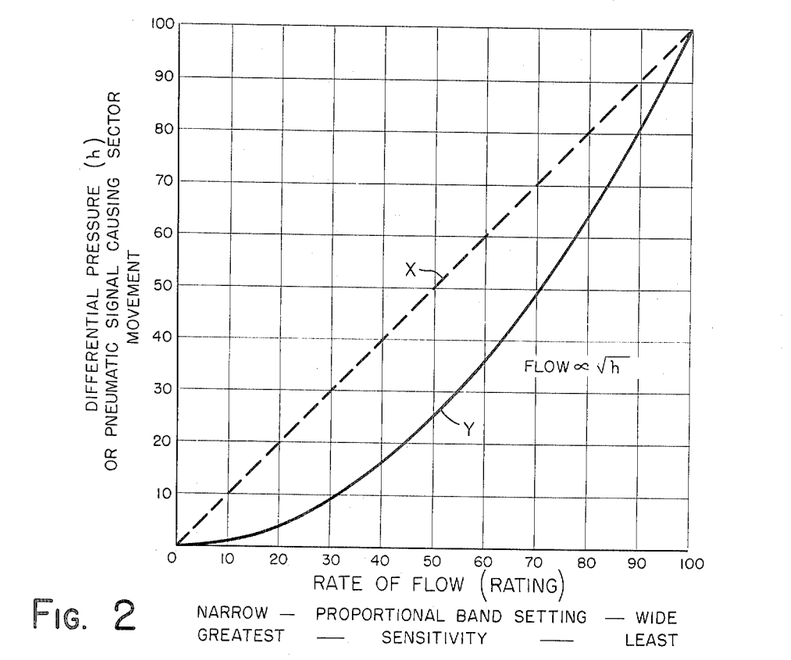
Fig. 2 is a graph of characteristics in connection with Fig. 1.

Reference may now be had to the graphs of Fig. 2 which will be used in explaining the need for the invention in the system of Fig. 1, the mode of accomplishing the same, and the results obtained. In this graph I have shown the base of consideration as the complete expected range of operation of the unit (0–100%) and an index of rating may preferably be the rate of steam outflow through the conduit 6. I contemplate however, as will be explained in connection with other figures of the drawing, that other variables in the operation of the unit may be utilized as an index of overall rating or rate of operation.

For the vertical axis of the graph I show differential pressure ($h$) on a 0–100% basis as developed by the flow of steam through the orifice 5, within the designed capacity of the system. Presumably 100% capacity differential pressure would be attained across the orifice 5 for 100% output rating of the unit and if the relation were linear the curve X would result, equal increments of flow producing equal increments of differential pressure. However, as previously explained the quadratic relation existing, between rate of flow through the orifice 5 and differential pressure resulting therefrom, results in a parabolic curve Y with flow varying as the square root of ($h$).

From curve Y it will be apparent that, at low rates of unit operation equal increments in change of rate of operation will result in minute changes in differential pressure (h) and therefore in the fluid loading pressure in pipe 10 and chamber A. On the other hand, at higher rates of operation, the same increment of change in rate of operation will result in a considerably greater change in differential pressure (h) across the orifice. The resultant effect upon the force-beam 17 is that at low rates of operation of the unit the pressures effective within the chambers A and B, as well as any discrepancy between said pressures, will be of a minute nature and far different from equal rating change effects at the higher ratings. Thus, at low ratings the resultant effect in pressure within the chamber D and output pipe 19 will be quite small at low ratings as compared to equivalent changes at high ratings. Preferably then we should vary the sensitivity of the relay 16, throughout its range of operation, so that it is of greater sensitivity at lower rates of operation and of least sensitivity at the higher rates of operation. Thus when the minor effects upon beam 17 occur (at the low rates of operation) I magnify or amplify such minute effects and obtain substantially the same output change that I do with the greater changes of the higher rates of operation. In other words I desirably move curve Y upward until it tends to coincide with curve X. I attain this desideratum through moving the sector 23 and thereby varying the sensitivity of the relay 16, from some indication of rate of operation of the unit as a whole, and this I accomplish through the agency of an expansible-contractible bellows 30 upon which I impose the loading pressure of pipe 10 representative of steam outflow rate as a rating index.

The bellows 30 is provided with a loading spring 31 and is arranged to position the pivoted linkage 32 which is joined for angular movement of the sector 23. An increase of pressure within the bellows 30, representative of increasing rate of operation of the boiler unit, positions the sector 23 in proper direction toward the wide proportional band setting and in the direction of least sensitivity. Conversely, as rating or demand tends to decrease the sector 23 is moved toward a position of greater sensitivity. Calibration of the bellows 30 and spring 31, as well as arrangement of the linkage 32 and point of attachment of the same to the sector 23, is a matter of engineering design to result in the desired curve.

The output control fluid pressure of the relay 16, available in the balancing bellows D and the output pipe 19, is impressed upon the A' chamber of a standardizing relay 35. The relay 35 is, in general, similar in design and arrangement to the relay 16 but without the provision for automatically moving the sensitivity adjusting sector. Hand adjustability may be provided if desired.

To the B chamber of relay 35 is connected the pipe 13 transmitting a fluid loading pressure continuously representative of liquid level within the drum 1. A force unbalance condition of the beam 17A is then effected by variation in pressure within the chamber A' as well as by variations effective in the bellows B' due to departure of liquid level from predetermined value. Thus, either a discrepancy between the steam flow-water flow relation, or a departure of liquid level from desired value, will upset the balance of beam 17A and cause a movement of the baffle 20A relative to the nozzle 21A from the predetermined balance position of the couple. Such a disturbance of the couple balance position results in a change in output control pressure of the relay 35, effective in output pipe 36 as well as in the D' chamber of the relay. The same output control pressure is effective in the C' chamber of relay 35 but at a rate determined by an adjustable restriction 37. The arrangement whereby variations in output pressure within the pipe 36 are felt immediately upon the D' chamber and through a restriction upon the C chamber, with later equalization between the two, provides a reset and standardizing action of the nature disclosed and claimed in the Gorrie patent Re. 21,804 and described in connection with the Gorrie application S. N. 311,098, filed September 23, 1952.

The function of the standardizing relay 35 is to reproduce the loading relationship between chambers A and B in the outgoing control pressure pipe 36 and by means of a regenerative action, to amplify the change in outgoing control pressure until the incoming effect is returned to a predetermined value, i. e. until level within the drum 1 is returned to its desired level. This action gives a proportional plus reset response. A floating control of high sensitivity superimposed upon a positioning control which may be of relatively low sensitivity. The result, in the output pipe 36, is that upon change in the relationship between the A and B chamber pressures, there is an immediate response in pressure change in pipe 36 in the same direction followed by continuing regenerative readjustment of the pressure in pipe 36 which may be in the same direction or in the opposite direction, until the condition (level) is satisfied.

Positioned in the output pipe 36 is a manual-automatic selector station 38 whose output, effective in a pipe 39, is a final control fluid pressure for the valve 3, established either manually at the station 38, or passed therethrough from the pipe 36 as a resultant of the automatic control operation. The valve 3 is provided with a positioner 40 of the type generally disclosed and claimed in the application of H. H. Gorrie et al., S. N. 47,516, filed September 2, 1948, now Patent 2,679,829 and provides the possibility of characterizing the impulse of pipe 39 in its effect upon the control of water inflow rate through the conduit 2. Such a characterizing positioner is arranged to regulate the incremental variation in water supply rate in linear or other desired relation to increments to pressure change within the pipe 39, overcoming adverse valve characteristics, variations in feed water supply pressure, or water-steam differential pressure variations, as well as other variables which might affect the relation between pressure changes in pipe 39 and resulting flow rate corrections.

Figures 3, 4, 7:
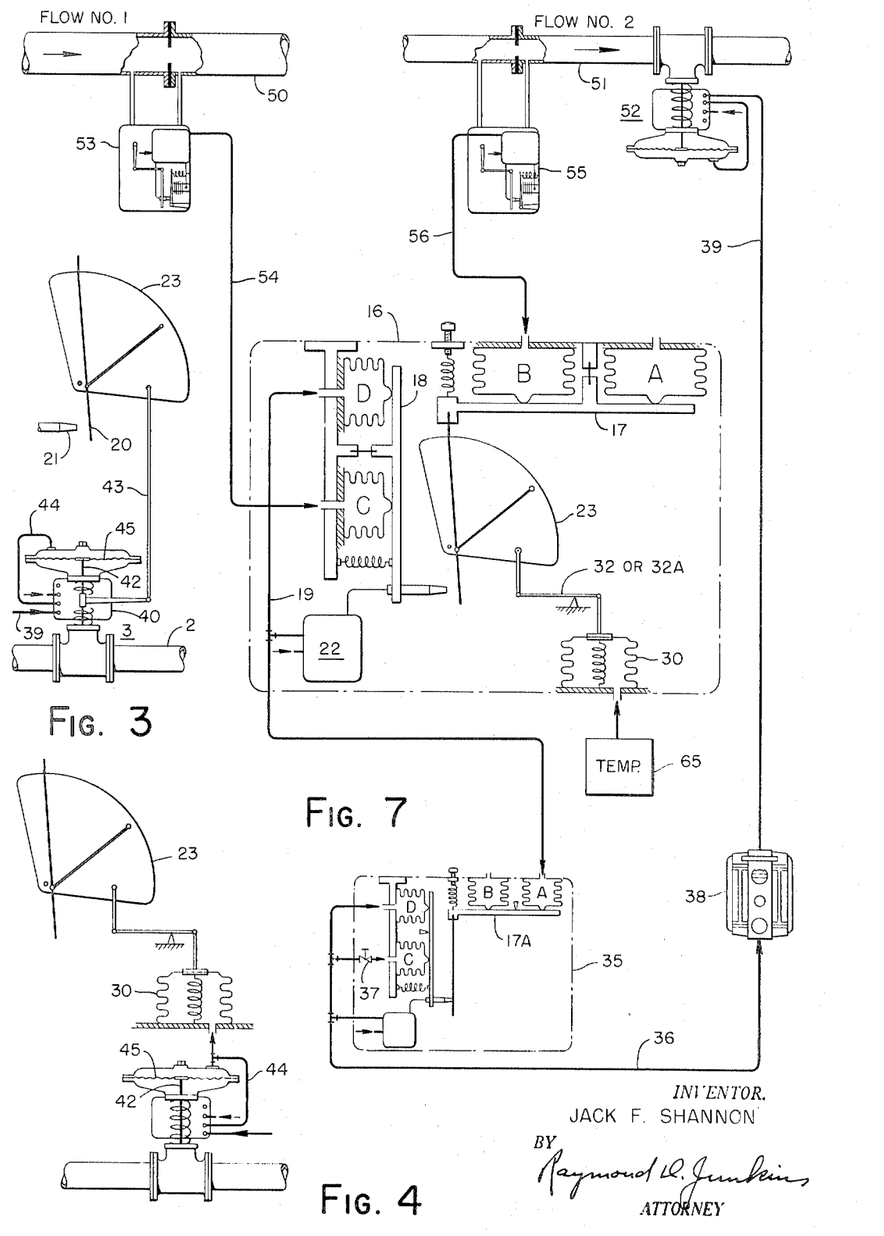
Fig. 3 is a diagram of a portion of the control system of Fig. 1 including a variation in relay actuating means.
Fig. 4 is a modification of a portion of Fig. 3.
Fig. 7 illustrates a fluid flow ratio control system wherein the ratio is established by a variable condition or value.

In Fig. 3 I show an arrangement similar to that of Fig. 1 except that I illustrate the automatic positioning of the proportional band or sensitivity adjustment of relay 16 from another index of rating or demand upon the unit as a whole. Herein the valve 3, characterized by the positioner 40 as in Fig. 1, utilizes the position of valve stem 42 as a demand index to position the sector 23 by way of the linkage 43. The relay 16 may be mounted directly on the valve structure as is the positioner 40. The loading pressure in pipe 39, acting through the characterizing positioner 40, results in a valve stem 42 position which is directly representative of rate of flow of water through the conduit 2 and thus in general an indication of rating or demand upon the entire unit. Inasmuch as the functioning of the entire system is substantially instantaneous there is no appreciable lag in transmitting changes in position of the valve stem 42 into a new positioner movement of the sector 23.

Inasmuch as the valve stem 42 is positioned by the diaphragm 45 under the influence of a pressure acting through the pipe 44 (output of positioner 40) it is evident that the said pressure may be impressed upon the bellows 30 of Fig. 1 to accomplish the desired result, and this I illustrate in Fig. 4.

Figures 5, 6, 8, 9:
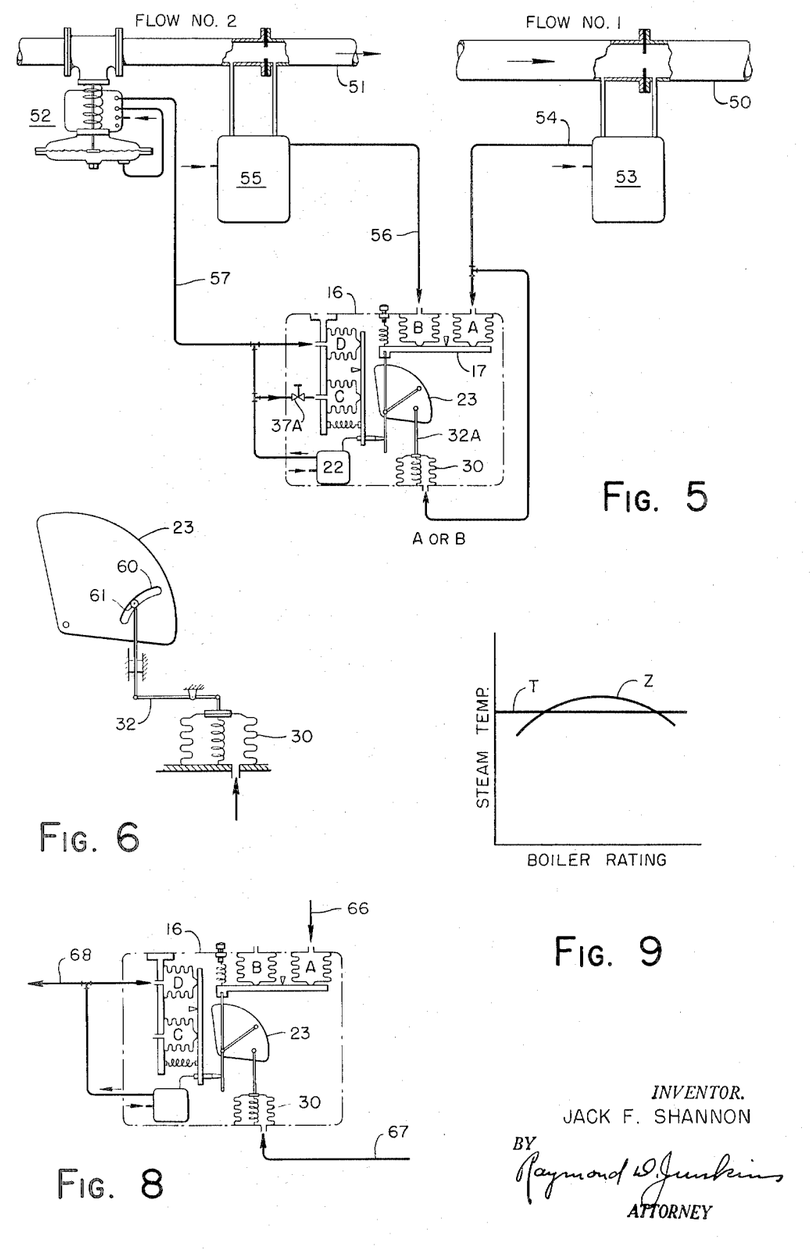

In Fig. 5 I diagrammatically illustrate the incorporation of my improved relay in a flow ratio control utilizing either flow rate meters or head meters.

Consider first the case with flow rate meters where equal increments of flow rate result in equal increments of fluid loading pressure. "Flow No. 1," of a fluid flowing through a conduit 50, is considered the dictator. "Flow No. 2," of a second fluid flowing through a conduit 51, is the slave. A control valve 52, in conduit 51, is regulated to maintain "Flow No. 2" in desired ratio to "Flow No. 1."

A meter 53 is adapted to establish a pneumatic loading pressure in pipe 54 continuously representative of fluid rate of flow through conduit 50 and the relation is linear. Similarly, the meter 55 establishes a pneumatic loading pressure in pipe 56 in linear relation to flow rate through conduit 51. Pipe 54 joins the A chamber, and pipe 56 joins the B chamber, of relay 16. In Fig. 5 I show the pipe 54 also joining the bellows 30 although, under certain conditions, I may wish to join pipe 56 to the bellows 30.

The booster 22 provides an output pneumatic control pressure for a pipe 57 leading to the control valve 52, loads the balancing relay D chamber and, through an adjustable restriction 37A, loads the relay C chamber. A standardizing reset action is provided, as explained in connection with relay 35 of Fig. 1.

The relay 16 is provided with a proportional band or sensitivity adjusting sector 23. Adjustment of this sector will change the sensitivity of the control pressure output of 22 with an unbalance of beam 17.

It is possible to introduce a constant difference between Flow No. 1 and Flow No. 2 by the spring adjustment on beam 17. However, this would result in a variable ratio as the flow rate changes. The assumption is, of course, that there is sufficient capacity design of the conduits, orifices, and meters to allow maintenance of the desired difference or ratio.

In some instances, due to the system response of the control circuit, it may be required to vary the sensitivity either directly or inversely with flow rate while maintaining a constant ratio. The arrangement of Fig. 1 allows the automatic setting of the sensitivity of the system by the adjustment of sector 23 from variations in the dictating or master flow rate in conduit 50. A predetermined ratio is maintained in the following manner. An increase in the pressure of chamber A of relay 16, resulting from an increase in flow rate in conduit 50, will unbalance the beam 17. This unbalance operates the fluid pressure couple to effect an increase in output of 22 and an opening of control valve 52 creating an increase in the signal from meter 55 which, connected to the B chamber, will balance the initial increase in the A chamber pressure. The sequence is identical in the opposite direction of change in flow rate.

Assume that I desire to maintain a constant ratio of 2:1, with Flow No. 1 always twice Flow No. 2 regardless of variations in Flow No. 1. This may be accomplished by sizing the orifices producing the operative differentials for meters 53 and 55 such that the flow rate in pipe 50 is twice the flow rate in pipe 51 for the same percent range of each meter. The output of 22 will then maintain a position of the control valve 52 such that beam 17 will remain in balance, thereby maintaining a constant ratio. For a 2:1 ratio

| Percent Range Both Meters | Flow No. 1, Lbs./Hr. | Flow No. 2, Lbs./Hr. |
|---|---|---|
| 25 | 50 | 25 |
| 50 | 100 | 50 |
| 75 | 150 | 75 |
| 100 | 200 | 100 |

This indicates that an error, reduced to pounds per hour, is more critical at low rates of flow than the same error at higher rates of flow, in view of the requirement to maintain a constant ratio within desired limits. Therefore, the sensitivity should be the greatest at low rates of flow, and decrease with an increase in flow rate. This may be desirable to avoid hunting or cycling of the control system. The bellows 30 is connected by a direct linkage 32A to sector 23, and the pneumatic loading pressure of pipe 54, representative of Flow No. 1, is impressed upon bellows 30. By adjustment of this linkage, the relay may be set to give any desired range of sensitivity change.

It may be desirable, under certain conditions, to require an increase in sensitivity with an increase in flow rate. This may be accomplished by a reverse acting linkage between bellows 30 and sector 23.

The second case to consider, for the system of Figure 1, is where meters 53 and 55 are head meters, producing in pipes 54 and 56 respectively, pneumatic loading pressures bearing a non-linear relation to flow rate in accordance with curve Y of Fig. 2. In this application, even more so than with linear flow rate meters, it is desirable to have a greatly increased sensitivity at low flow rates since a small change in flow at a low rate creates a change in head much less than a similar change in flow at a higher rate.

In this second case, however, the unbalance in beam 17 loading, as Flow No. 1 increases, is not only one caused by flow differences to maintain a constant ratio, but additionally introduces the difference in loading pressure increments (representative of head) as discussed in connection with Fig. 1. The positioning of sector 23 becomes one of satisfying both differences and this may lead beyond the exact arrangement of Fig. 5. In Fig. 6 I show that the sector 23 may be provided with a shaped slot 60 guiding a roller 61 which may be carried on the end of linkage 32 (or 32A). Thus, the bellows 30 positions sector 23 through the means 60, 61 providing a further characterizing possibility.

In Fig. 7, there is illustrated a flow control system which automatically ratios one fluid flow to another and allows the resetting of the ratio in accordance with a third variable. The problem specifically illustrated and described is representative, or by way of example only.

In a chemical treatment process two fluids are desirably to be maintained at a predetermined ratio at one temperature, but with the ratio desirably different at other temperatures. The temperature may be of one or the other of the component flows, of the mixture, or any desired temperature. In fact, the ratio adjusting variable need not be temperature but may be pressure, pH, viscosity or some other variable.

The meters 53 and 55 are flow rate meters for the fluids flowing in conduits 50 and 51 respectively. Thus the pneumatic loading pressures established in the pipes 54 and 56 bear linear relation to the respective flows. The dictator Flow No. 1 has its loading pressure applied to the C chamber of relay 16 while the slave or follower Flow No. 2 has its representative fluid loading pressure applied to the B chamber. The A chamber is an idle chamber open to the atmosphere. The output of booster relay 22, available in output pipe 19, is applied to the balancing D chamber for the force-beam 18. The pressure in pipe 19 is further applied to the A chamber of standardizing relay 35 whose output, in pipe 36, acts through the selector station 38 and pipe 39 to position the control valve 52 for Flow No. 2. Under certain conditions the pipes 54 and 56 may desirably be interchanged as to chambers C and B, or as to C and A.

Relay 16 is a ratio relay with its proportional band setting determining the ratio between force-beam 17 and force-beam 18. Were the sector 23 to remain in a preselected position then a uniform ratio would be had between Flow No. 1 and Flow No. 2. The dictator flow, applied to the C chamber, upsets the balance of force-beam 18, resulting in a change in D chamber pressure which tends to balance the force-beam 18 against the new C chamber pressure while, substantially simultaneously, the change in flow through the conduit 51 is in proper direction to affect the force-beam 17 and the nozzle-baffle relationship. With the proportional band adjustment intermediate the beams 17, 18, any change in flow rate in conduit 50 will result in a new flow rate within conduit 51 in desired ratio to the dictator rate when the relay system has balanced out.

Device 65 represents a controller establishing a fluid loading pressure for bellows 30 continuously representative of a temperature. Inasmuch as the bellows 30, acting through linkage 32 or 32A, positions the proportional band sector 23, it will be apparent that the ratio between the two flows of conduits 50 and 51 may be varied in accordance with a temperature condition or any similar variable which may be applied as through 65 to the bellows 30.

Fig. 8 is somewhat similar to the relay 16 of Fig. 7 but illustrates how a pneumatic loading pressure representative of a single variable, as applied by the pipe 66 to the A chamber of relay 16, may be changed in its characteristic either remotely manually or in accordance with a second variable. The fluid loading pressure of the pipe 66, representative of the value of a variable within a predetermined range, is desirable to be amplified, decreased, or otherwise changed in accordance with a fixed ratio or some predetermined non-linear multiplication, the bellows 30 may be receptive to a fluid loading pressure in pipe 67 remotely manually established or continuously established in accordance with some variable such as temperature 65 of Fig. 7. The output of the relay 16, available in pipe 68 and the balancing D chamber of the relay, will bear predetermined relation to the pressure within pipe 66 determined by the setting of the sensitivity sector 23. As the relay is a ratio relay and the ratio between the pressures 66 and 68 is determined by the proportional band setting of the sector 23 the ratio may be shifted by means of the bellows 30 along a linear or other desirable curve. Furthermore, this may be done either remotely manually or under the domination of some other variable condition or value.

Reference to Fig. 9 shows one type of curve relationship which may be accomplished by the present invention with reference by way of example to Fig. 8. In Fig. 9 is an exemplary plot of superheated steam temperature conditions for a vapor generator. Overall unit rating is indicated as the X-axis while final total steam temperature is indicated at the Y-axis. The uniform line T represents the desired final superheated steam temperature throughout the controllable range of boiler rating. Curve Z is a characteristic curve of a combination of radiant and convection superheaters and it will be observed that curve Z crosses the T line at two points in the controllable ranges of boiler rating. Thus any control of superheated steam temperature must act, in effect in one direction at lower ratings and in the other direction at higher ratings. If a loading pressure applied to some controllable factor in the boiler operation, for regulating final superheated steam temperature, is characterized with boiler rating then the control can properly act to tend to make curve Z coincide with curve T. Such a possibility is indicated by the relay of Fig. 8 wherein some index of rating or demand upon the boiler is applied to bellows 30 and the sector 23 incorporates a desired characterizing curve 60 of Fig. 6. Through proper combination of the positioning of sector 23 and design of slot 60, the incoming control pressure at pipe 66 may be characterized, in its output value in pipe 68, in accordance with some expected curve such as Z of Fig. 9.

Figures 10, 11:
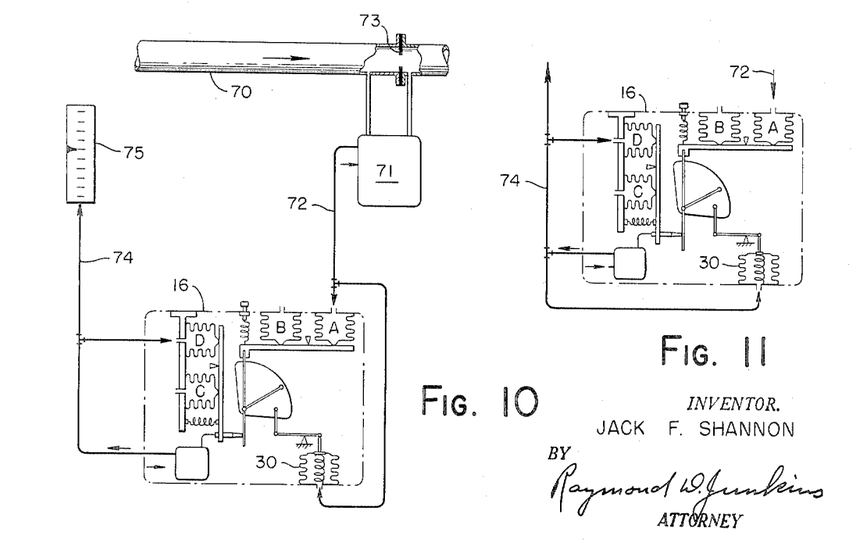
Figs. 10 and 11 illustrate two arrangements of the relay inserted in a fluid flow measuring system for extracting a functional relation.

In Fig. 10 I depict the use of relay 16 as a square root extractor in a flow measuring system wherein the rate of flow of fluid through a conduit 70 is continuously measured by a head meter 71 establishing, in a pipe 72, a pneumatic loading pressure continuously representative of differential pressure or head across an orifice 73 located in the conduit 70. The fluid loading pressure within the pipe 72 is applied to the A chamber of relay 16 as well as to the sector moving bellows 30. The relay establishes in the balancing D chamber and in the output pipe 74 a pneumatic control or output pressure bearing a linear relation to fluid rate of flow which may be indicated with equal graduations upon an indicator 75. In other words the relay 16 of Fig. 10 continuously extracts the square root relation between differential pressure (head) and fluid rate of flow as represented by the pneumatic loading pressure within pipe 72 and the output pressure in pipe 74.

Another way of accomplishing the same thing is shown in Fig. 11 wherein the incoming fluid loading pressure representative of head is again applied by way of the pipe 72 to the A chamber of relay 16 while the output pneumatic pressure in pipe 74 is introduced into the bellows 30. In Fig. 10 the sector is moved by the bellows 30 sensitive to non-linear increments of differential pressure, while in Fig. 11 the sector is moved through the agency of linear increments of flow rate. Either arrangement may be used, it only being necessary to properly adjust the linkages and motions and/or to form the sector 23 with a characterizing slot 60 as in Fig. 6. Certain ranges, capacities and other conditions will indicate which of the two arrangements is most advantageous.

It will be evident that the arrangements of Figs. 10, 11 and 6 are by no means limited to the extraction of the square root or quadratic relation between differential pressure and rate of flow. The relationship between the pneumatic pressures in pipes 72 and 74 may be corrected as to the square, square root, or some other functional relationship for example the five halves power encountered in weir measurement of liquids.

While I have illustrated and described certain preferred embodiments of my invention, it will be appreciated that this is by way of example only, and that I am not to be limited thereby.

The disclosure of this application is included in copending continuation-in-part applications S. N. 468,244, filed November 12, 1954, and S. N. 568,123, filed February 27, 1956.

What I claim as new and desire to secure by Letters Patent of the United States is:

1. A fluid pressure relay of the force-position-balance type, including in combination, a first force-balance beam pivoted intermediate its ends, a first pair of substantially similar expansible-contractible fluid pressure receiving chambers mounted to have their movable walls opposingly act upon the beam at opposite sides of the pivot, unbalance of the chamber forces acting upon said beam tending to angularly position it about its pivot, an adjustable loading means for the beam; a second force-balance beam pivoted intermediate its ends, a second pair of substantially similar expansible-contractible fluid pressure receiving chambers mounted to have their movable walls opposingly act upon the second beam at opposite sides of its pivot, unbalance of the second chamber forces acting upon said second beam tending to angularly position it about its pivot, a second adjustable loading means for the second beam; a fluid pressure nozzle-baffle couple having one element positioned by the first beam and the other element positioned by the second beam, a supply of pressure fluid for the couple, relative position of the elements of the couple controlling bleed of supply pressure fluid to the atmosphere thus establishing an output control fluid pressure from the relay, adjustable sensitivity means arranged to bias the positioning of one of the couple elements by its positioning beam, and fluid pressure responsive means arranged to position the said sensitivity means thus establishing the proportional band of the relay in accordance with remotely established fluid pressure values impressed upon the said fluid pressure responsive means.

2. The relay of claim 1 including pipe means interconnecting said fluid pressure responsive means with one of the four expansible-contractible chambers thereby positioning the biasing means responsive to the chosen chamber pressure.

3. In a fluid flow measuring system, in combination, a measuring transmitter establishing a fluid loading pressure continuously representative of functional values relating to a variable to be measured, the relay of claim 1, pipe means communicating the transmitter loading pressure with one of the first pair of chambers and the said fluid pressure responsive means, an exhibitor of the variable graduated in equal increments, and a passage conducting the output control fluid pressure established by the relay to one of the second pair of chambers and to the exhibitor.

4. In a fluid flow measuring system, in combination, a measuring transmitter establishing a fluid loading pressure continuously representative of differential pressure in quadratic relation to the flow rate to be measured, the relay of claim 1, pipe means communicating the transmitter loading pressure with one of the first pair of chambers and with the said fluid pressure responsive means, an exhibitor of fluid flow rate graduated in equal increments, and a passage conducting the output control fluid pressure established by the relay to one of the second pair of chambers and to the exhibitor.

5. The relay of claim 1 wherein the adjustable sensitivity means is an angularly movable sector having a pivot spaced from the segment's axis and connected by a floating link to one of the couple elements, and a characterizing cam provision connecting the fluid pressure responsive means to the sector for positioning the latter.

6. The relay of claim 1 wherein the said fluid pressure responsive means is a fifth expansible-contractible chamber.

7. In a fluid flow controlling system in combination, the relay of claim 6, a first measuring transmitter establishing a first fluid loading pressure continuously representative of a first fluid flow, a second measuring transmitter establishing a second fluid loading pressure continuously representative of a second fluid flow to be controlled in relation to the first fluid flow, pipe means subjecting one of the fluid loading pressures upon one of the first four mentioned chambers and other pipe means subjecting the other fluid loading pressure upon another of the first four mentioned chambers, means subjecting upon the fifth chamber a proportional band dictating fluid pressure, and a regulating valve controlling the second fluid flow responsive to the relay output control fluid pressure.

8. In a fluid flow controlling system in combination, the relay of claim 6, a first measuring transmitter establishing a first fluid loading pressure continuously representative of a first fluid flow to be measured, a second measuring transmitter establishing a second fluid loading pressure continuously representative of a second fluid flow to be measured and controlled in relation to the first fluid flow, pipe means subjecting one of the fluid loading pressures upon one of the first pair of chambers and also upon the fifth chamber of said relay, other pipe means subjecting the other of the fluid loading pressures upon the other of the first pair of relay chambers, and a regulating valve for the second fluid flow to be controlled sensitive to the relay output control fluid pressure.

9. In a fluid flow controlling system in combination, the relay of claim 6, a first measuring transmitter establishing a first fluid loading pressure continuously representative of differential pressure in quadratic relation to the flow rate of a first fluid flow to be measured, a second measuring transmitter establishing a second fluid loading pressure continuously representative of differential pressure in quadratic relation to the flow rate of a second fluid flow to be measured and controlled, pipe means subjecting one of the fluid loading pressures upon one of the first pair of chambers and also upon the fifth chamber of said relay, pipe means subjecting the other of the fluid loading pressures upon the other of the first pair of relay chambers, and a regulating valve for the second flow to be controlled sensitive to the relay output control fluid pressure.

10. The system of claim 9 including a third measuring transmitter establishing a third fluid loading pressure continuously representative of a third variable, and a second relay continuously comparing the first relay output control fluid pressure and the said third fluid loading pressure, the resultant output fluid control pressure of said second relay arranged to position the regulating valve.

11. A fluid pressure relay of the force-position-balance type, including in combination, a first force-balance beam pivoted intermediate its ends, a first pair of substantially similar expansible-contractible fluid pressure receiving chambers mounted to have their movable walls opposingly act upon the beam at opposite sides of the pivot, unbalance of the chamber forces acting upon said beam tending to angularly position it about its pivot, an adjustable loading means for the beam; a second force-balance beam pivoted intermediate its ends, a second pair of substantially similar expansible-contractible fluid pressure receiving chambers mounted to have their movable walls opposingly act upon the second beam at opposite sides of its pivot, unbalance of the second chamber forces acting upon said second beam tending to angularly position it about its pivot, a second adjustable loading means for the second beam; a fluid pressure nozzle-baffle couple having one element positioned by the first beam and the other element positioned by the second beam, a supply of pressure fluid for the couple, relative position of the elements of the couple controlling bleed of supply pressure fluid to the atmosphere thus establishing an output control fluid pressure from the relay, adjustable sensitivity means arranged to bias the positioning of one of the couple elements by its respective positioning beam, an input loading pressure imposed upon one of the first pair of chambers, a fifth expansible-contractible chamber fluid pressure responsive means arranged to position the said sensitivity means, and pipe means communicating the output control pressure with one of the second pair of chambers and with the said fifth chamber.

12. A feed water control system for a vapor generator having feed water supply provisions including a conduit, a vapor outflow conduit from the generator, a first measuring transmitter establishing a fluid loading pressure continuously representative of vapor outflow, a second measuring transmitter establishing a fluid loading pressure continuously representative of feed water inflow, the relay of claim 1, pipe means subjecting the vapor outflow representative fluid loading pressure upon one of the first pair of chambers and upon the said fluid pressure responsive means, pipe means imposing the feed water inflow representative fluid loading pressure upon the other of said first pair of chambers, a third measuring transmitter establishing a third fluid loading pressure continuously representative of liquid storage in the generator, a second relay continually comparing the output control pressure of the first relay with said third fluid loading pressure, and a water inflow regulating valve in the supply conduit sensitive to the resultant second relay output control fluid pressure.

References Cited in the file of this patent
UNITED STATES PATENTS

| | | |
|---|---|---|
| Re. 21,804 | Gorrie | May 20, 1941 |
| 2,098,913 | Dickey | Nov. 9, 1937 |
| 2,285,540 | Stein et al. | June 9, 1942 |
| 2,296,714 | Ibbott | Sept. 22, 1942 |
| 2,517,081 | Caldwell | Aug. 1, 1950 |
| 2,529,875 | Howard | Nov. 14, 1950 |